US011461739B2

(12) United States Patent
Everton et al.

(10) Patent No.: US 11,461,739 B2
(45) Date of Patent: Oct. 4, 2022

(54) PRIVACY-SENSITIVE, MULTI-CALENDAR SYNCHRONIZATION

(71) Applicant: CalendarBridge Inc, Chicago, IL (US)

(72) Inventors: Paul Everton, Chicago, IL (US); Frank Robles, San Francisco, CA (US); Chad Gilles, Chicago, IL (US)

(*) Notice: Subject to any disclaimer, the term of this patent is extended or adjusted under 35 U.S.C. 154(b) by 162 days.

(21) Appl. No.: 16/793,153

(22) Filed: Feb. 18, 2020

(65) Prior Publication Data

US 2021/0256480 A1 Aug. 19, 2021

(51) Int. Cl.
| | | |
|---|---|---|
| *G06Q 10/10* | (2012.01) | |
| *G06F 9/54* | (2006.01) | |
| *H04L 67/1095* | (2022.01) | |
| *H04L 67/52* | (2022.01) | |

(52) U.S. Cl.
CPC ......... *G06Q 10/1095* (2013.01); *G06F 9/542* (2013.01); *H04L 67/1095* (2013.01); *H04L 67/52* (2022.05)

(58) Field of Classification Search
CPC . G06Q 10/1095; G06F 9/542; H04L 67/1095; H04L 67/18
USPC ........................................................ 705/7.19
See application file for complete search history.

(56) References Cited

U.S. PATENT DOCUMENTS

| | | | | |
|---|---|---|---|---|
| 8,538,992 B1* | 9/2013 | Lawyer | ................. | G06Q 10/109 |
| | | | | 707/790 |
| 2006/0015539 A1* | 1/2006 | Wolf | ........................ | G06F 16/27 |
| 2007/0203954 A1* | 8/2007 | Vargas | ................... | G06F 16/278 |
| 2009/0248480 A1* | 10/2009 | Miksovsky | ......... | G06Q 10/1095 |
| | | | | 705/7.19 |
| 2016/0147857 A1* | 5/2016 | Kramer | .................. | G06F 16/258 |
| | | | | 707/634 |
| 2016/0203444 A1* | 7/2016 | Frank | ..................... | G06F 3/0484 |
| | | | | 705/7.19 |
| 2017/0323225 A1* | 11/2017 | Caligor | ................... | G06Q 10/00 |
| 2018/0189744 A1* | 7/2018 | Frank | ................... | G06Q 10/1095 |
| 2019/0007327 A1* | 1/2019 | Baldi | ....................... | H04L 45/64 |

* cited by examiner

*Primary Examiner* — Alan S Chou

(57) ABSTRACT

A system comprises circuitry configured to operate as a calendar synchronization service and to operate as a database service. The calendar synchronization service is configured to query the domain name system to determine which one or more levels of event information are permitted to be propagated from a first electronic calendar hosted by a first calendar host to a second electronic calendar hosted by a second calendar host. The database service is configured to store rules for propagating events on the first electronic calendar to the second electronic calendar. The calendar synchronization service may be configured to receive, via an application programming interface (API), a notification of a first event on the first electronic calendar, wherein the first event has a start time, duration, summary, description, and one or more attendees. The calendar synchronization service is configured to determine, based on the rules, to-be-propagated other properties of the first event.

20 Claims, 14 Drawing Sheets

Bridge Setup (step 3)

630

| Source | Destination | Bridge Type | notifications | |
|---|---|---|---|---|
| | | | source | dest |
| Main Calendar<br>John.doe@company.com | Main Calendar<br>John.doe@gmail.com | Free/busy ▽  ⟵616 | 640⤳ ● keep<br>○ delete<br>○ add | 642⤳ ● Don't add<br>○ add |
| Main Calendar<br>John.doe@gmail.com | Main Calendar<br>John.doe@company.com | full ▽  ⟵620 | 644⤳ ○ keep<br>● delete<br>○ add | 646⤳ ○ Don't add<br>● add |

614

Save
622

FIG. 6C calendars table

| User_id | Acct_id | Acct type | Acct_name | Cal_id | Cal_name |
|---------|---------|-----------|-----------|--------|----------|
| user1   | acct1   | Google    | Gmail     | 0001   | Gmail main |
| user1   | cal2    | Exchange  | company   | 0002   | Company main |
| user1   | cal3    | Exchange  | company   | 0003   | Company team meetings |

FIG. 7A

Events table

| event_id (724) | src_cal_id (728) | event_subject (734) | event_datetime (736) | event_details (738) |
|---|---|---|---|---|
| event1 (720_1) | 11424 | "Meeting" | 1/1/2020 9:00 | (atendees, location etc.) |
| event2 (720_2) | a15dr | "Meeting2" | 1/1/2020 11:00 | (atendees, location etc.) |
| ○ ○ | | | | |

FIG. 7B

Bridges table (739)

| souce_cal (742) | dest_cal (744) | rules (746) |
|---|---|---|
| cal1 (740_1) | cal2 | Free/busy |
| cal3 (740_2) | cal2 | full |
| cal2 (740_2) | cal3 | subject |
| ○ ○ ○ | | |

PRIVACY-SENSITIVE, MULTI-CALENDAR SYNCHRONIZATION

BACKGROUND

Limitations and disadvantages of conventional approaches to management of multiple electronic calendars will become apparent to one of skill in the art, through comparison of such approaches with some aspects of the present method and system set forth in the remainder of this disclosure with reference to the drawings.

BRIEF DESCRIPTION OF THE DRAWINGS

FIGS. 7A-7C illustrate an example database schema used by an example implementation of the calendar synchronization system of FIG. 1.

DETAILED DESCRIPTION

Figure 1:
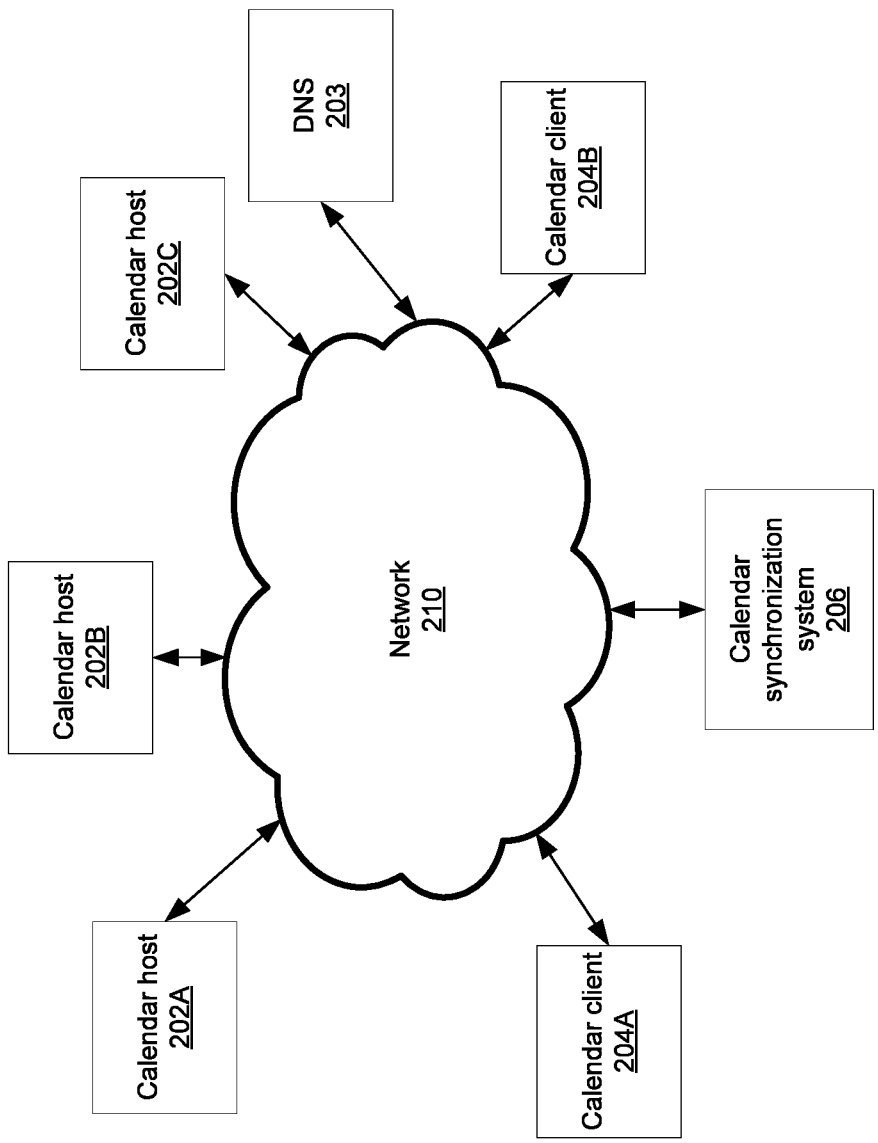
FIG. 1 shows an example networked environment comprising a calendar synchronization system that supports privacy-sensitive, multi-calendar synchronization.

FIG. 1 shows an example networked environment comprising a calendar synchronization system that supports privacy-sensitive, multi-calendar synchronization. Shown are a calendar hosts 202A-202C, calendar clients 204A and 204B, calendar synchronization system 206, and domain name system (DNS) 203 connected by network 210 (e.g., the Internet and one or more local area networks).

The DNS 203 operates to store information about devices connected to the Internet. For example, MX records in the DNS 203 are used to determine the IP address to which to send email addressed to a particular domain name. TXT records in the DNS system can be used for associating arbitrary information with a domain name or IP address. Because DNS records are critical to an entity's business and reputation, access to services for altering DNS records is very tightly controlled. Thus, if someone has the ability to modify the TXT records associated with a domain name, it is reasonable to assume that person is authorized to act on behalf of the owner of the domain name. Accordingly, aspects of this disclosure use TXT records as a way to establish trust and determine a level of calendar synchronization permitted for calendars associated with the domain name.

Each of the calendar hosts 202A-202C comprises one or more computer systems configured to host calendaring software that provides users with an electronic version of a calendar. The calendar hosts can run any calendaring software, but for clarity of description the remainder of this disclosure will assume calendar host 202A is Microsoft Exchange Online, calendar host 202B is Google (GSuite or Gmail), and calendar host 202C is an on-premises Microsoft Exchange server.

Each of the calendar hosts 202A-202C provides an application programming interface (API) that calendar clients (e.g., Microsoft Outlook, Gmail, etc.) can use to interact with the hosted calendars (e.g., to view, add, update, and remove events). Unfortunately, different calendar hosts typically use different, proprietary APIs, so there are no standard commands for performing calendar tasks (e.g., reading, adding, updating, and removing events) that work across the different email hosts 202A-202C. For example, a particular task may require a first API call to calendar host 202A but require 2 different API calls to calendar hosts 202B. Furthermore, calendar hosts are only configured to communicate with calendar clients, not with other calendar hosts. Thus, there is no straightforward way to synchronize two different calendars hosted on two different calendar hosts. Instead, synchronization is local to each calendar client. An example will help illustrate the problems that result from this situation.

For example, assume a user has calendars on each of calendar hosts 202A (calendar 1), 202B (calendar 2), and 202C (calendar 3); the calendar client 204A is an application on the user's laptop; and calendar client 204B is an application on the user's mobile device. Upon "syncing" (typically involving identifying the calendar host and entering the user's credentials for that host) of each of the calendars to client 204A, the user can now see all 3 calendars in client 204A. But that local view is not reflected anywhere else. The calendars are not synchronized on the calendar hosts 202A-202C. That is, calendar 1 still only has events created on calendar 1, calendar 2 still only has events created on calendar 2, and calendar 3 still only has calendar events created on calendar 3. And the calendars are not synchronized on other email clients. If, for example, the user wants to see all three calendars on client 204B, the synching steps performed on client 204A will have to be repeated on client 204B. But often corporate policies/access restrictions prevent synching some calendars on some devices. For example, calendar 3 may be restricted (e.g., due to privacy or confidentiality concerns) to only client 204A on her laptop. In that situation, calendar client 204B cannot provider her a complete view of her schedule, which can result in missed meetings, double-booked timeslots, etc.

The calendar synchronization system 206 eliminates these headaches by automatically synchronizing calendars across calendar hosts. To continue the previous example, the calendar synchronization system 206 can automatically sync calendar 1 events to calendars 2 and 3, calendar 3 events to calendars 1 and 3, and calendar 3 events to calendars 1 and 2. Thus, simply by synching any one of the three calendars, calendar client 204B can provide the user a complete view of her schedule. To guard against the sharing of sensitive information, the calendar synchronization system 206 is operable to provide different levels of synchronization between calendar hosts, with each level corresponding to different details being propagated between calendars and calendar hosts. In one implementation, the details that are to be shared for a particular calendar is determined by a TXT record associated with the domain name associated with that calendar.

Figure 2:
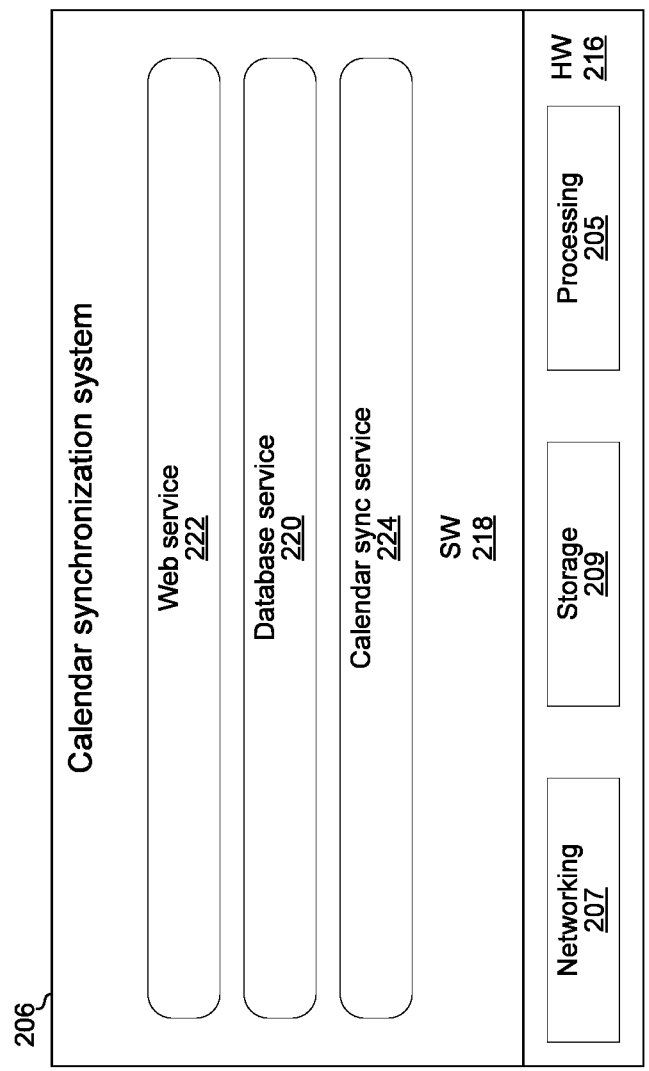
FIG. 2 shows the architecture of an example implementation of the calendar synchronization system of FIG. 1.

FIG. 2 shows the architecture of an example implementation of the calendar synchronization system of FIG. 1. The system 206 comprises hardware 216 and software 218.

The hardware 216 comprises networking hardware 207 (e.g., network adaptors, MODEMS, routers, switches, and/ or the like), storage hardware 209 (e.g., RAM, ROM, solid state drives, hard disk drives, and/or the like), and processing hardware 205 (e.g., CPUs, GPUs, and/or the like). The hardware resources 216 may reside on a single computer or may be distributed among a plurality of computers.

The software 218 runs on the hardware 216 and configures the hardware to operate as a web service 222, a database service 220, and a calendar synchronization service 224.

The web service 222 is operable to: host a web application (e.g., based on HTML, CSS, and JavaScript delivered via http(s)); provide one or more endpoints for a receiving (e.g., via http(s)) API calls (e.g., from calendar hosts 202A-202C and from a web browser running the web application provided by the web service 222); and to issue (e.g., via http(s)) API calls to calendar hosts 202A-202C.

The database service 220 is operable to store and retrieve data from the storage 208. The database can use any suitable data structure, but for purposes of illustration this disclosure will assume a relational database. An example database schema is described below with reference to FIGS. 7A-7C.

The calendar synchronization service 224 is operable to issue API calls to the calendar hosts 202A-202C (e.g., to perform calendar tasks on the calendars hosted by the hosts 202A-202C), receive API calls from the calendar hosts 202A-202C (e.g., callbacks in response to calendar tasks performed on the calendars hosted by calendar hosts 202A-202C), interact with the database service 220 to read and write data to/from storage 208, and interact with the web service 222.

Figure 3:
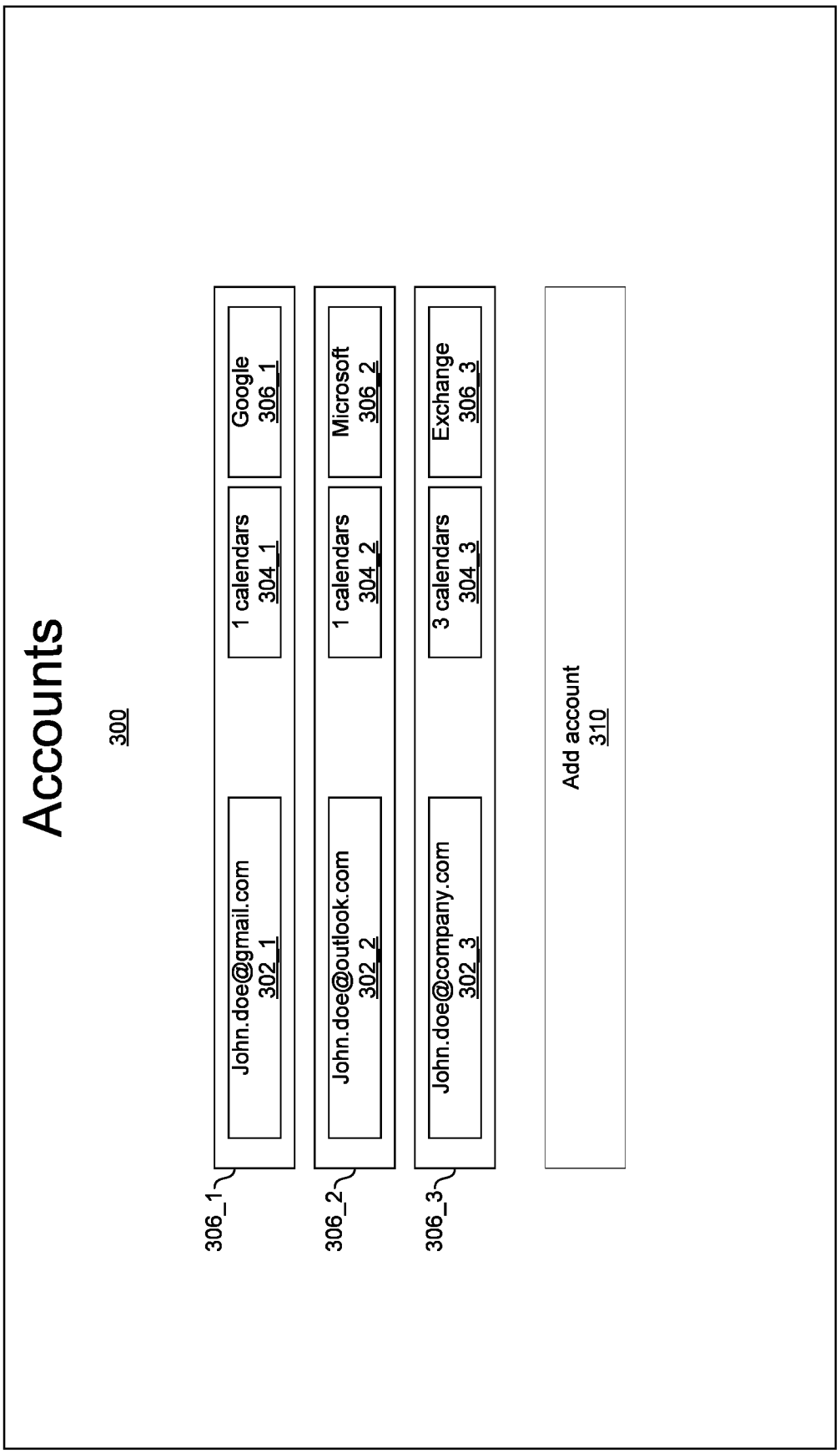
FIGS. 3-6C illustrate aspects of a user interface of an example implementation of the calendar synchronization system of FIG. 1.

FIG. 3 shows an example accounts view 300 of the web application provided by web service 222 of the calendar synchronization system 206. For a user logged-in to the application, the accounts view 300 displays that user's calendar hosting accounts. In the example shown, user John Doe is logged in and has three accounts with three different calendar hosts. User interface (UI) element 306_1 corresponds to an account on gmail.com that has 1 calendar. UI element 306_2 corresponds to an account on outlook.com that has 1 calendar. UI element 306_3 corresponds to an account on company.com that has 3 calendars. Each UI element 306 has a UI element 302 that displays the primary email address associated with the account, a UI element 304 that displays the number of calendars associated with the account, and a UI element 306 that indicates the calendar hosting type or service. Clicking a UI element 306 may bring up an account calendars view 400 shown in FIG. 4.

Also shown is a UI element 310 that, when activated, brings up a view for adding another account. Such a view would typically include controls to identify the service with which to connect and for entering credentials for that service. Upon providing the correct credentials, the calendar hosting service provides an OAuth token for the calendar synchronization system 206 to use when making API calls to the calendar hosting service.

Figure 4:
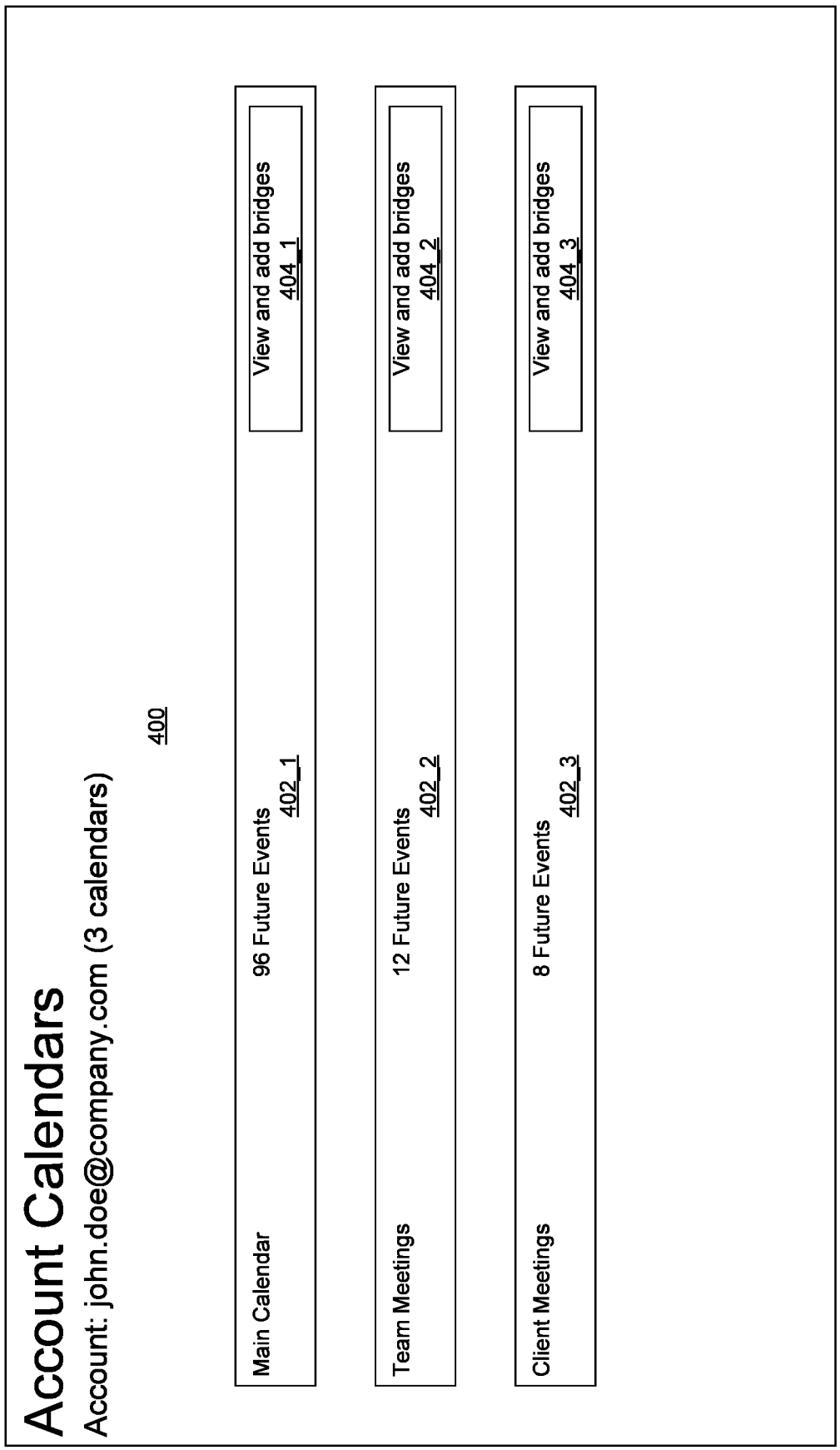

FIG. 4 shows an example account calendars view 400 of the web application provided by web service 222 of the calendar synchronization system 206. The view 400 shows the calendars of a particular account that has been connected (e.g., using OAuth 2.0) to the calendar synchronization system 206. In the example shown, there are three calendars associated with the account john.doe@company.com. Each of the calendars is associated with a respective one of UI elements 402_1-402_3. Each element 402 contains the name of the calendar, a snippet indicating how many future events are on that calendar, and a UI control 404 to bring up the bridges view 500 shown in FIG. 5. As described further below, a bridge between two calendars establishes rules for which information about one or more events should be synchronized between the two calendars.

Figure 5:
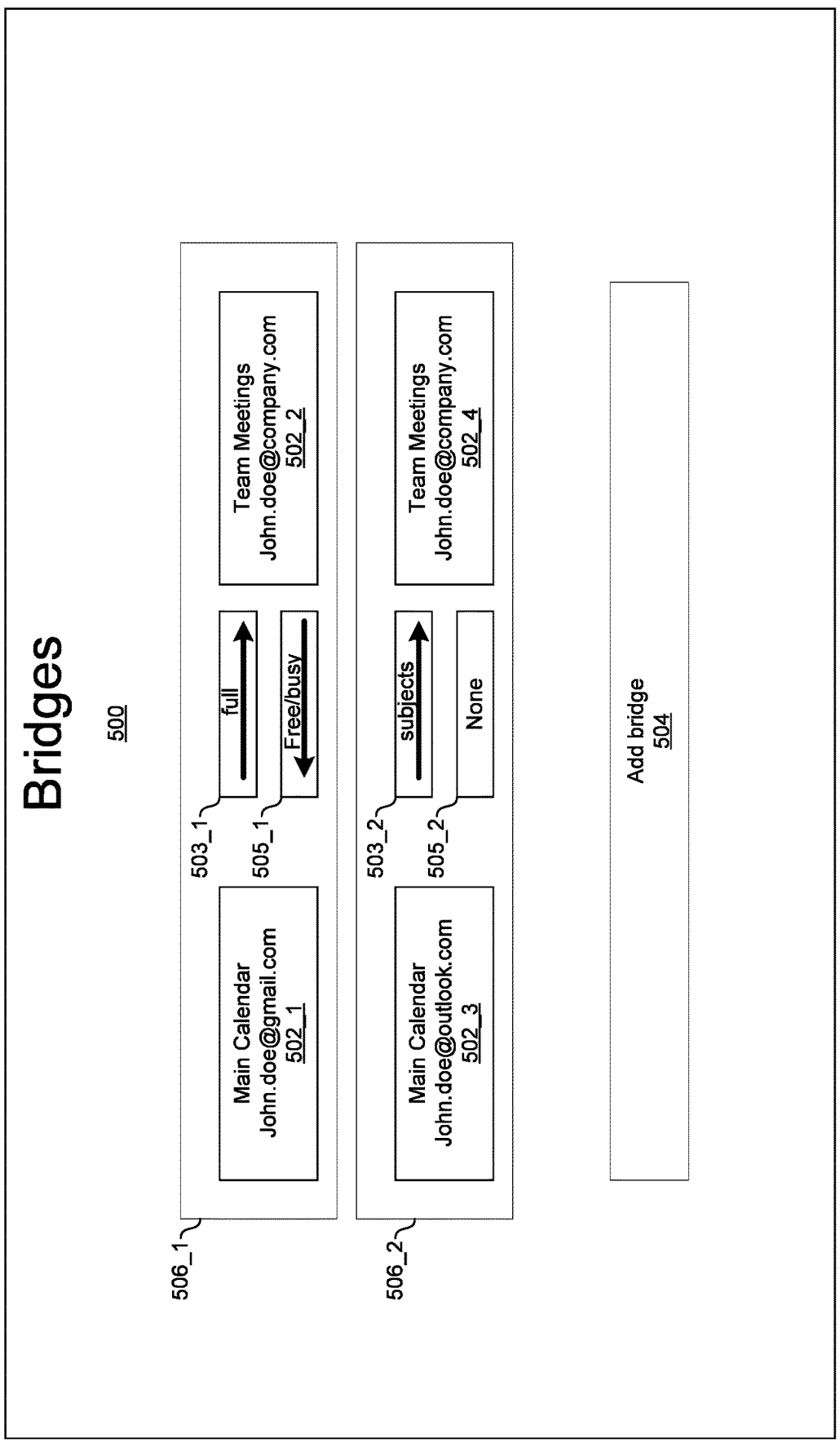

FIG. 5 shows an example bridges view 400 of the web application provided by web service 222 of the calendar synchronization system 206. The view 500 displays the bridges that the user has configured between her connected calendars. Each UI element 506 corresponds to a bridge and comprises: two UI elements 502 corresponding to the two calendars associated with the bridge; a UI element 503 which indicates the type of, or rules for, the bridge (i.e., which type of information is to be shared) from the first calendar to the second calendar; and a UI element 505 which indicates the type of, or rules for, the bridge from the second calendar to the first calendar.

In an example implementation there are three types of bridges/levels of information to propagate: (1) propagate all event information (e.g., all properties—including ORGANIZER, ATTENDEE(S), SUMMARY, DESCRIPTION, and others—of a iCalendar file that represents the event as it is known to the source calendar); (2) propagate only event timing and a short blurb of the subject of the event (e.g., DTSTART, DTEND, and SUMMARY properties of an iCalendar file that represents the event as it is known to the source calendar); and (3) propagate only the timing of the event (e.g., DTSTART and DTEND properties of an iCalendar file that represents the event as it is known to the source calendar) so that the destination calendar only conveys that the user is "busy" during the event, but not what or where s/he is busy doing. In the example shown in FIG. 5, UI element 503_1 indicates that all properties of events on the gmail are propagated to the team meetings calendar, but UI element 505_1 indicates that, for events that originate on the team meetings calendar, only a corresponding "busy" event is created on the gmail calendar (i.e., only start and end time properties are propagated). In the example shown, UI element 503_2 indicates that, for events originating on the outlook.com calendar, only the subject of the event (and not details such as location and participants) is propagated to a corresponding event on the team meetings calendar. In the other direction, represented by UI element 505_2, events originating on the team meetings calendar do not result in any corresponding event being created on the outlook.com calendar. Also shown in FIG. 5 is UI element 504 which brings up a series of views, shown in FIGS. 6A-6C, for adding a new bridge.

Figure 6A:
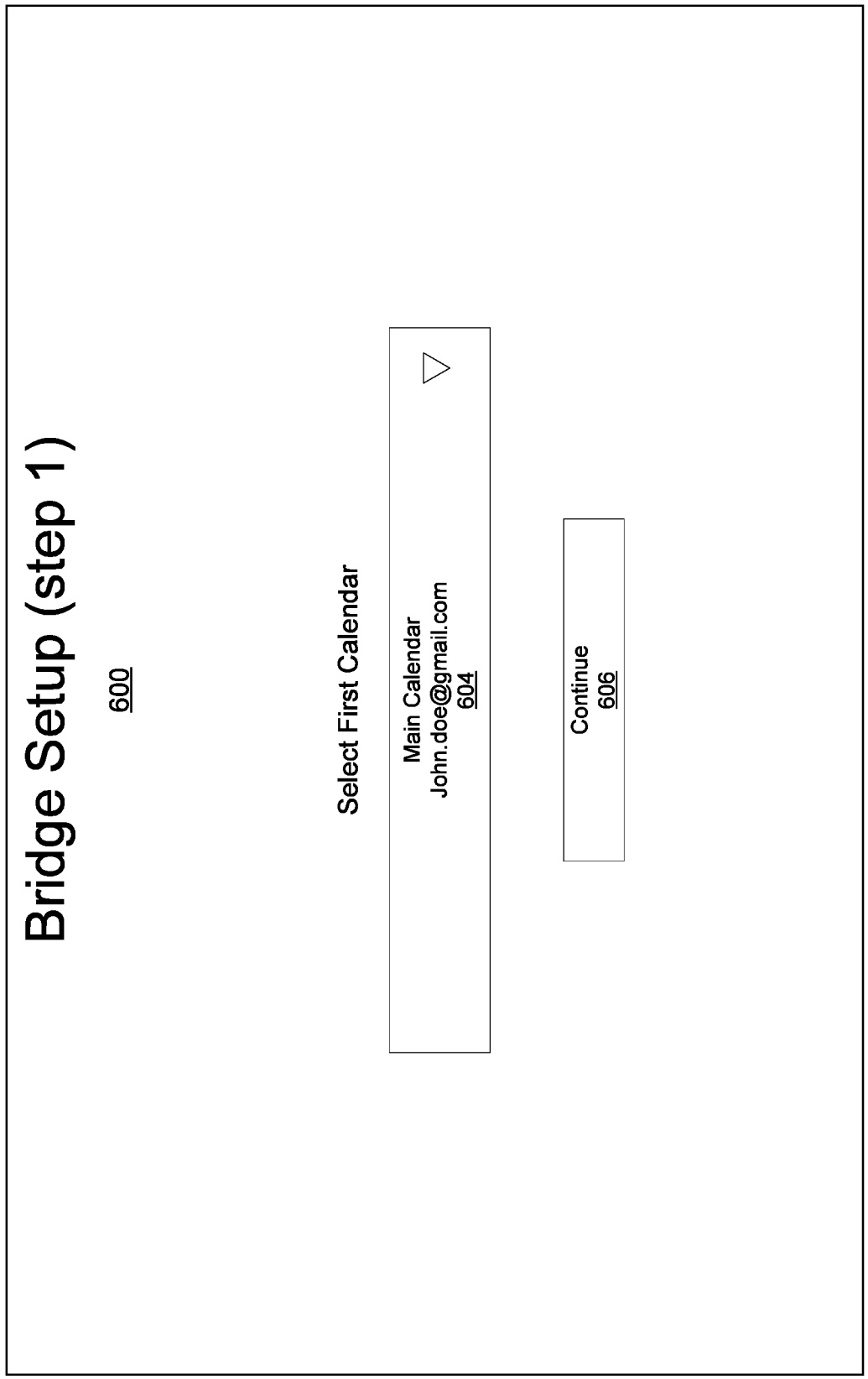

FIG. 6A shows a first view 600 of a process for setting up a new bridge between two calendars hosted on different calendar hosts. In view 600, the user uses UI element 604 (e.g., a dropdown menu that lists all calendars of users connected accounts) to select a first calendar for the bridge. Then the user clicks UI element 606 to advance to view 621 of FIG. 6B.

In view 621, the user uses UI element 610 to select a second calendar for the bridge. Then the user clicks UI element 612 to advance to view 630 of FIG. 6C.

In view 630, UI element 614 enables configuring which event properties are to be propagated in each direction and how notifications for the events are to be handled. UI element 616 is used to select what type/level of information for events originating on the first calendar (Main calendar on john.doe@company.com account in the example shown) should be propagated to the second calendar (Main calendar on the john.doe@gmail.com account in the example shown). Similarly, UI element 620 is used to select the type/level of information for events originating on the second calendar should be propagated to the first calendar. In the example shown, each UI element 616 and 620 enables selecting between three levels of information: (1) only showing whether free or busy; (2) showing only the summary property (often used as the subject line on email invites for the event), but not other information such as participants or location; (3) showing all information (i.e., all properties of the event on the source calendar are propagated to the destination calendar). In other implementations, other levels of sharing/propagation of different properties is possible. Similarly, other implementations may provide more advanced rules for determining what information to propagate from source calendar to destination calendar. For example, the level/type of information to be shared from the source calendar to the destination calendar may depend on when the event occurs (e.g., during or outside of business house), the participants of the event, the creator of the event (i.e., who sent the event invite), and/or other factors. Once the user has configured the UI elements 616 and 620 as desired, activating UI element 622 saves the bridge to the database.

Syncing two calendars brings with it the issue of how to handle event notifications. A hypothetical will help illustrate. Assume an event "meeting" on the first calendar has an event notification (e.g., popup message, email, etc.) set for 15 minutes before the start of "meeting." When propagating "meeting" from the first calendar to the second calendar the user may want a notification for "meeting" only from the first calendar, only from the second calendar, from both calendars, or from neither of the calendars. Referring again to FIG. 6C, the bridge setup interface of the calendar syncing system may provide controls for configuring this functionality. In the example shown, UI elements 640, 642, 644, and 646 (radio buttons in the example shown) are used to manage event notifications set on the first and second calendars. UI elements 640 and 642 configure how to handle notifications when propagating events from the first calendar to the second calendar. UI elements 644 and 646 configure how to handle notifications when propagating events from the second calendar to the first calendar.

UI elements 640 and 644 configure whether existing notifications set for the event on the source calendar should be kept or deleted on the source calendar (the "keep" and "delete" options in the example shown), and whether notifications should be added to the event on the source calendar (the "add" option in the example shown). The "add" option may, for example, be used in combination with the "delete" option to change notifications for synced events on the source calendar (e.g., the event source calendar may have a 15 minute reminder; the "delete" option may delete that notification, and the "add" option may set a 1 hour notification on the source calendar).

UI elements 642 and 646 configure whether existing notifications for the event on the source calendar should be carried over to the destination calendar (the "keep" and "delete" options in the example shown); and whether notifications should be added to the event on the destination calendar (the "add" option in the example shown). The "add" option may, for example, be used in combination with the "delete" option to have different notifications (e.g., different time and/or type of notification) on the destination calendar and the source calendar.

Configuration of notifications added through the "add" option may be configured via an interface of the calendar syncing system. For example, user interface controls may be provided for a user to specify the type(s) (email, popup, phone call, etc.) and timing (15 min before, 1 hour before, etc.) of notifications added to source and/or destination calendars during syncing. Such an interface may also enable configuring the notification "add" function to add multiple reminders for a single event. Some calendar hosts, however, only support a single notification for each event. In this situation, an "add" rule that specifies multiple reminders may trigger the calendar syncing system to add dummy events to the calendar, each of the dummy events being configured to generate a notification at a desired time. For example, the real event may have a notification set to "at the start time" and an additional notification 15 minutes before the event can be achieved by adding a dummy event with: (1) a start time of 15 minutes before the real event; and (2) a notification timing of "0 minutes before" the dummy event. As another example, the dummy event could be created with: (1) a start time at the same time as the real event; and (2) a notification timing set to "15 minutes before" the dummy event. Dummy events may be given particular subjects, assigned particular colors/categories/styling (provided in some calendar hosts APIs), added to a calendar dedicated to dummy events, and/or otherwise configured so that it is clear to the user upon looking at her calendar that they are dummy events and not the corresponding real events.

FIG. 7A shows a calendars table in an example implementation of the database service 220 of the calendar synchronization system 206. Each record 702 in the table corresponds to a calendar that has been connected to the calendar synchronization system 206. Each record 702 comprises a user_id field 704, an account_id field 706, an account_type field 708, an account_name field 710, a calendar_id field 712, and a calendar_name field 714.

The user_id field 704 of record 702_X stores a unique identifier of the user that owns the calendar of record 702_X. The account_id field 706 stores a unique identifier for the calendar hosting account associated with the calendar of record 702_X. The account_type field 708 indicates the type of the calendar of record 702_X (e.g., Gmail, Gsuite, Microsoft O365, outlook.com, yahoo.com., Exchange, Apple, etc.). The account_name field 710 stores a name given to the account by its owner. The calendar_name field 714 stores a name given to the calendar by its owner.

FIG. 7B shows an events table in an example implementation of the database service 220 of the calendar synchronization system 206. Each record 720 corresponds to an event on a calendar that has been connected to the calendar synchronization system 206. Each record 720 comprises an event_id field 724, a source_calendar_id field 728, an event_subject field 734, an event_datetime field 736, and an event_details field 738. The event_id field 724 stores a unique identifier of the event. The source_calendar_id field 728 stores the identifier of the calendar on which the event 720_X was originally created. The event_subject field 734 stores a subject of the event (typically conveyed as the "summary" field in an iCalendar file). The event_datetime field 736 stores the date, start time, and end time of the event. The event_details field 738 stores additional details about the event such as, for example, information typically found in organizer, attendee, description, and/or other properties of an iCalendar file.

FIG. 7C shows an bridges table in an example implementation of the database service 220 of the calendar synchronization system 206. Each record 740 in the bridges table corresponds to a bridge setup by a user of the calendar synchronization system 206. Each record 740_X comprises a source_calendar field 742 that stores the identifier of the source calendar, a destination_calendar field 744 that stores the identifier of the destination calendar, and a rules field 746 that stores rules of the bridge. In the example shown, each rule corresponds to a level and/or type of event information to be shared from the source calendar to the destination calendar. In the example shown, the rules field 746 for each record takes one of three values: (1) free/busy (only share with the destination calendar the times when the user is busy on the source calendar); (2) subject (only share with the destination calendar the times and subject (or "summary") of events on the source calendar); (3) share with the destination calendar all details of events on the source calendar (e.g., full contents of what might be present on an iCalendar invite for the event).

Figure 8:
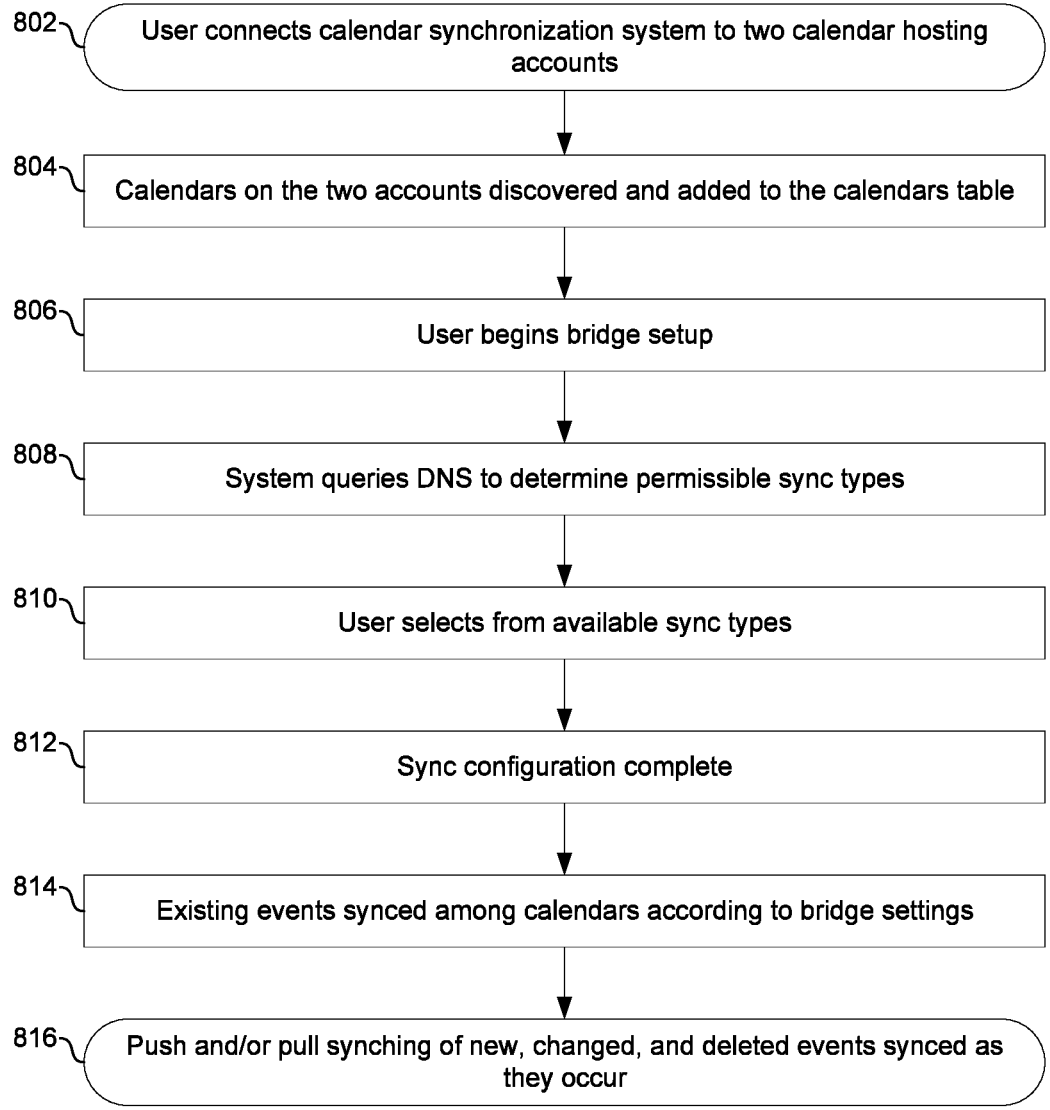
FIG. 8 is a flowchart of an example process for configuring calendar synchronization based on rules published to the domain name system (DNS).

FIG. 8 is a flowchart of an example process for configuring calendar synchronization based on rules published to the domain name system (DNS).

The process begins with block 802 in which a user connects two calendar hosting accounts (e.g., an exchange-hosted account and a google hosted account) to her account on the calendar synchronization system 206. This may be achieved through the application hosted by the web service 222, with the user entering her credentials for the calendar hosting accounts and then the calendar hosts providing an OAuth 2.0 token to the calendar synchronization system 206 for future authentication and authorization of access to calendars associated with the user's accounts.

In block 804, the calendar synchronization system 206 interacts with the calendar hosts, using their respective APIs, to sync the user's calendars, which may comprise adding the events on the user's calendars to the calendars table 703.

Figure 6B:
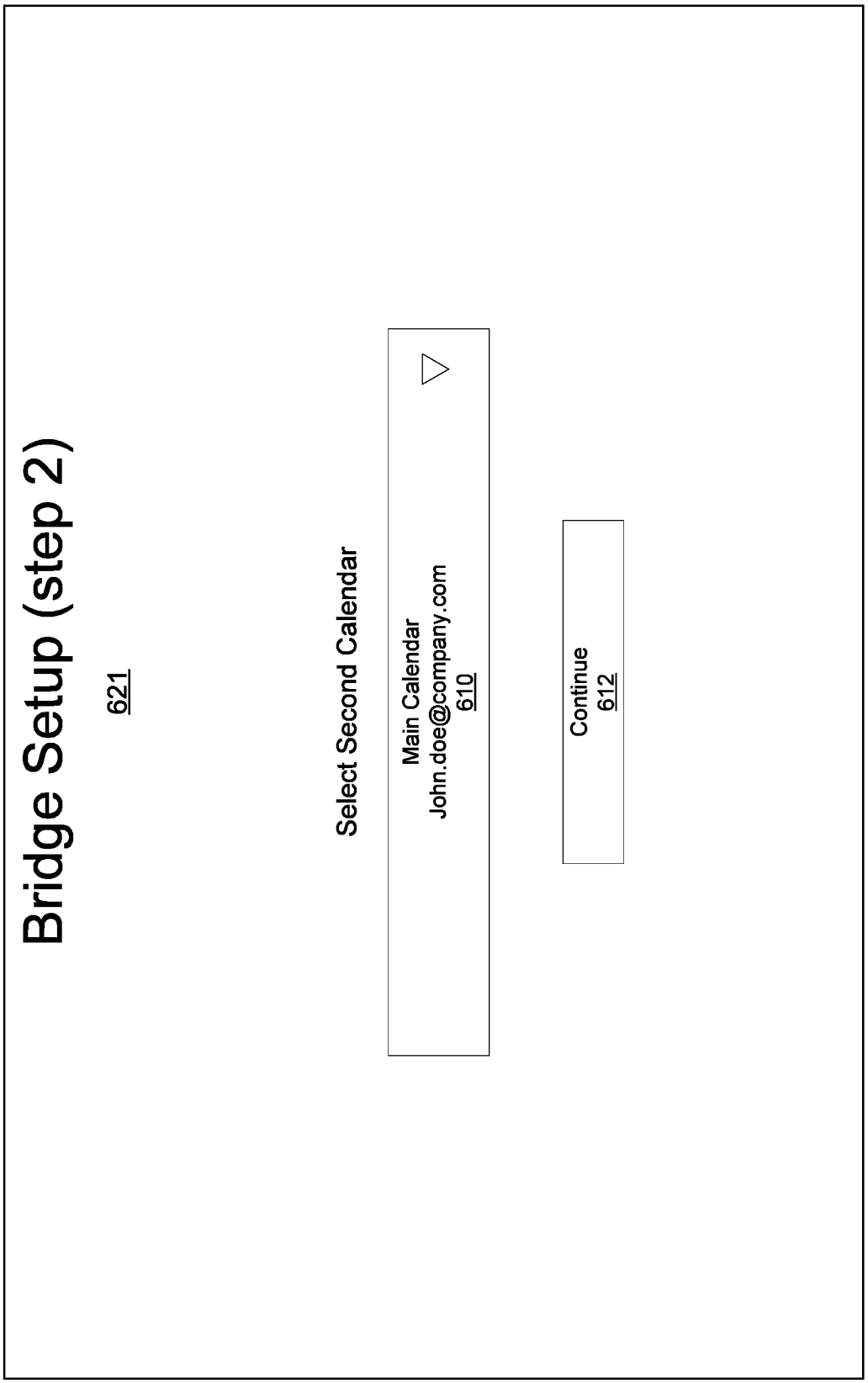

In block 806, the user begins setting up a bridge between a first calendar on the first calendar host and second calendar on the second calendar host. The user may, for example, select a company1.com calendar in view 600 (FIG. 6A), then a company2.com calendar in view 621 (FIG. 6B).

In block 808, the system 206 may query DNS records for TXT records associated with the calendar hosts. In this example, TXT records associated with calendar1.com and calendar2.com may be retrieved from DNS.

If a TXT record is found, the calendar synchronization system 206 parses the TXT record to see if it contains any fields specifying sync rules for the calendar synchronization system 206. For example, the calendar synchronization system 206 may look for TXT records containing "calendar sync: free/busy," or "calendar sync: subject," or "calendar sync: full." Upon finding such a TXT record, the calendar synchronization system 206 may restrict the type/level of information that the user is permitted to propagate from calendars on that domain to calendars on other domains. To illustrate, assume that company1.com has a TXT record with "calendar sync: free/busy" and company2.com has a TXT record with "calendar sync: full." In that case, the UI elements 616 and 620 (FIG. 6C) for a source calendar hosted on company1.com may only enable the user to select "no sync" or "free/busy" (i.e., "subject" and "full" are not options when a calendar on company1.com is the source calendar), whereas UI elements 616 and 620 for a source calendar hosted on company2.com may enable the user to select "no sync", "free/busy", "subject", or "full."

If a calendar synchronization TXT record is not found, then default sync types/level may be enforced for the domain. In one implementation, some domains without such TXT records may default to having all sync types/levels available and other domains without such TXT records may default to having only some sync types/levels available. For example, domains known to host free, personal email (e.g., outlook.com, gmail.com, etc.) may default to having all types/levels available, whereas other domains (e.g., corporate domains) may default to having only "free/busy" available (i.e., for corporate calendars, syncing of properties other than start and end times (to indicate when the calendar owner is "busy") requires opt-in from someone who has administrator privileges to the corporation's DNS records).

In block 810, the user uses UI elements 616 and 620 to configure rules of the bridge according to the available sync type/level options for the source calendar.

In block 812, the calendar synchronization system 206 completes establishing the bridge by, for example, populating additional database tables used to run scheduled jobs and/or subscribing to web hooks for the calendars involved in the bridge in order to detect changes to the source calendar(s) (e.g., added, removed, updated, and/or changed calendar events) which may then need to be propagated to the destination calendar(s) according to the rules of the bridge.

In block 814, the calendar synchronization system 206 performs an initial sync of existing events on the source calendar to the destination calendar according to the rules of the bridge.

In block 816, as events are added, changed, removed, etc. from the source calendar(s) of the bridge, the calendar synchronization system 206 detects the changes (via webhook notifications and/or periodic querying of the source calendar host) and propagates those changes to the destination calendar(s) according to the rules of the bridge.

Figure 9:
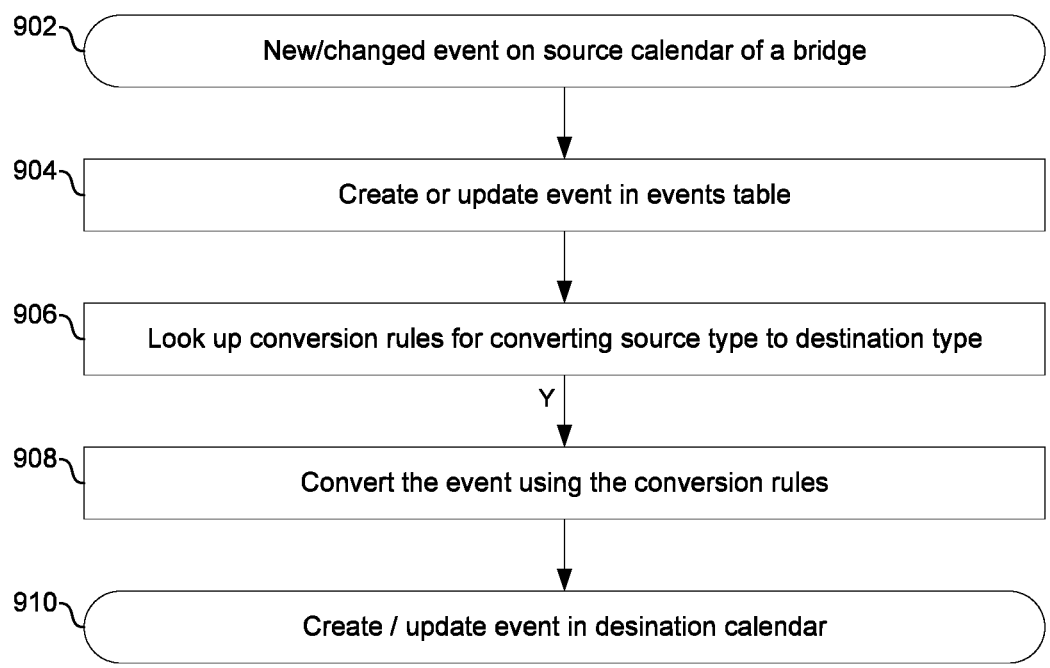
FIG. 9 is a flowchart of an example process for synchronizing calendars in accordance with this disclosure.

FIG. 9 is a flowchart of an example process for synchronizing calendars in accordance with this disclosure. The process begins with block 902 in which a change occurs (e.g., an event is added, updated, or removed) on a calendar which is a source calendar of a bridge on the calendar synchronization system 206.

In block 904, the events table of the database service 220 is updated to reflect the change in block 902.

In block 906, the calendar synchronization system 206 looks up rules for converting an event from a format used by the source calendar (e.g., as parameters submitted in API calls to the host of the source calendar) to a format used by the destination calendar (e.g., as parameters submitted in API calls to the host of the destination calendar). Such rules may, for example, be stored in a table of the database service 220 or in a flat file in storage 208. As one example, such rules may dictate that timestamps provided by the host of the source calendar may need to be converted to a different format, converted to a different time zone, and/or the like before they can be submitted to the host of the second calendar. As another example where conversion rules may be required is for recurring events—different calendar hosts may expect recurrence rules in different formats (e.g., one host's API may expect the recurrence rule in the format of an RRULE of the iCalendar specification, whereas another API may expect the recurrence rule in the format of a JSON object).

In block 908, the event is converted according to the conversion rules in block 906.

In block 910, the event added to the destination calendar using the destination calendar host's API.

In one implementation, synchronizing instances of a recurring event comprises: querying the source calendar for recurring event instances within a specified time range; querying the destination calendar for recurring instances for the same time range; iterating through the two lists to find the missing or deleted events in the source calendar; and deleting the corresponding instances in the destination calendar.

In one implementation, synchronizing instances of a recurring event comprises, upon receiving a boundary error in response to an attempt to modify an instance of a recurring event such that the modified instance would not be between a previous instance and next instance of the recurring event: delete the to-be-modified instance on the destination calendar; create a new event on the destination calendar corresponding to the desired modification; store, in the database service 220, a mapping between the new event on the destination calendar and both the recurring event series and the modified instance on the source calendar; update the new event as appropriate whenever there is a change to the recurring event series or the modified instance in the recurrent event series in the source calendar.

Figure 10A:
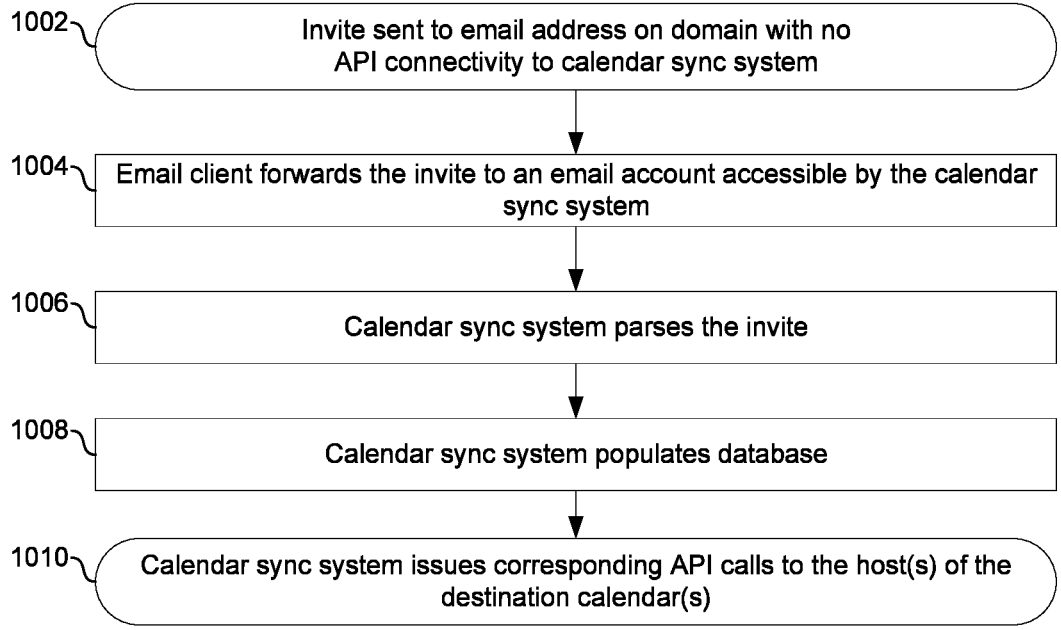
FIGS. 10A and 10B are flowcharts of example processes for propagating calendar invites to synchronized calendars.
Figure 10B:
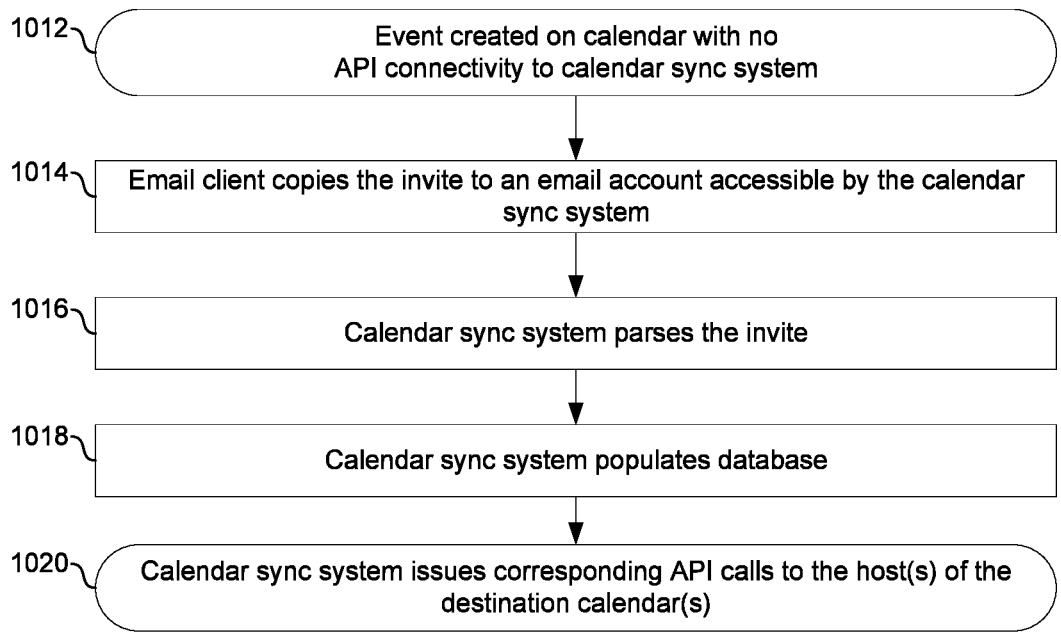

In some instances, the calendar synchronization system 206 may be prevented from connecting to a calendar host. This may be, for example, where the calendar host does not make available an API available that supports the functions needed to perform the calendar synchronization. The calendar synchronization system 206 may use invitations exchanged via email for establishing bridges with such a calendar host. FIGS. 10A and 10B are flowcharts of example processes for propagating calendar invitations to synchronized calendars. For FIGS. 10A and 10B assume a user of the calendar synchronization system 206 has a calendar ("no-API-support calendar") on a host which does not support API connectivity with the calendar synchronization system 206.

The process of FIG. 10A begins with block 1002 in which a calendar invitations is sent to an email address for the no-API-support calendar.

In block 1004, the user's email client forwards the calendar invitation to an email account accessible by the calendar synchronization system 206. For example, the user may have configured her email client to forward invitations to user@calendarsynchronizationsystem.com.

In block 1006, the calendar synchronization system 206 receives the email with the calendar invitation and parses the invitation (e.g., the invitation is in the form of an iCalendar file attached to the email and the calendar synchronization system 206 parses the iCalendar file based on the iCalendar specification).

In block 1008, the calendar synchronization system 206 updates one or more tables (e.g., the events table) in the database service 220 based on the invitation.

In block 1010, the calendar synchronization system 206 determines (e.g., by querying the bridges table) that the no-API-support calendar is a source calendar of one or more bridges and identifies the destination calendar(s) of the one or more bridges. The calendar synchronization system 206 then issues the necessary API calls to the host(s) of the destination calendar(s) to reflect the invited event on the destination calendar(s) (with the amount of information propagated to the destination calendar(s) determined by the sync level(s)/type(s) of the bridge(s)).

The process of FIG. 10B begins with block 1012 in which the user creates (or updates or removes), in her calendar client, an event on the no-API-support calendar.

In block 1014, the user's email client copies the calendar invitation to an email account accessible by the calendar synchronization system. For example, the user may have configured her email client to copy calendar invitations to user@calendarsynchronizationsystem.com.

In block 1016, the calendar synchronization system 206 receives the email with the calendar invitation and parses the invitation (e.g., the invitation is in the form of an iCalendar file attached to the email and the calendar synchronization system 206 parses the iCalendar file based on the iCalendar specification).

In block 1018, the calendar synchronization system 206 updates one or more tables (e.g., the events table) in the database service 220 based on the invitation.

In block 1020, the calendar synchronization system 206 determines (e.g., by querying the bridges table) that the no-API-support calendar is a source calendar of one or more bridges and identifies the destination calendar(s) of the one or more bridges. The calendar synchronization system 206 then issues the necessary API calls to the host(s) of the destination calendar(s) to reflect the invited event on the destination calendar(s) (with the amount of information copied to the destination calendar(s) determined by the sync level(s)/type(s) of the bridge(s)).

Figure 11:
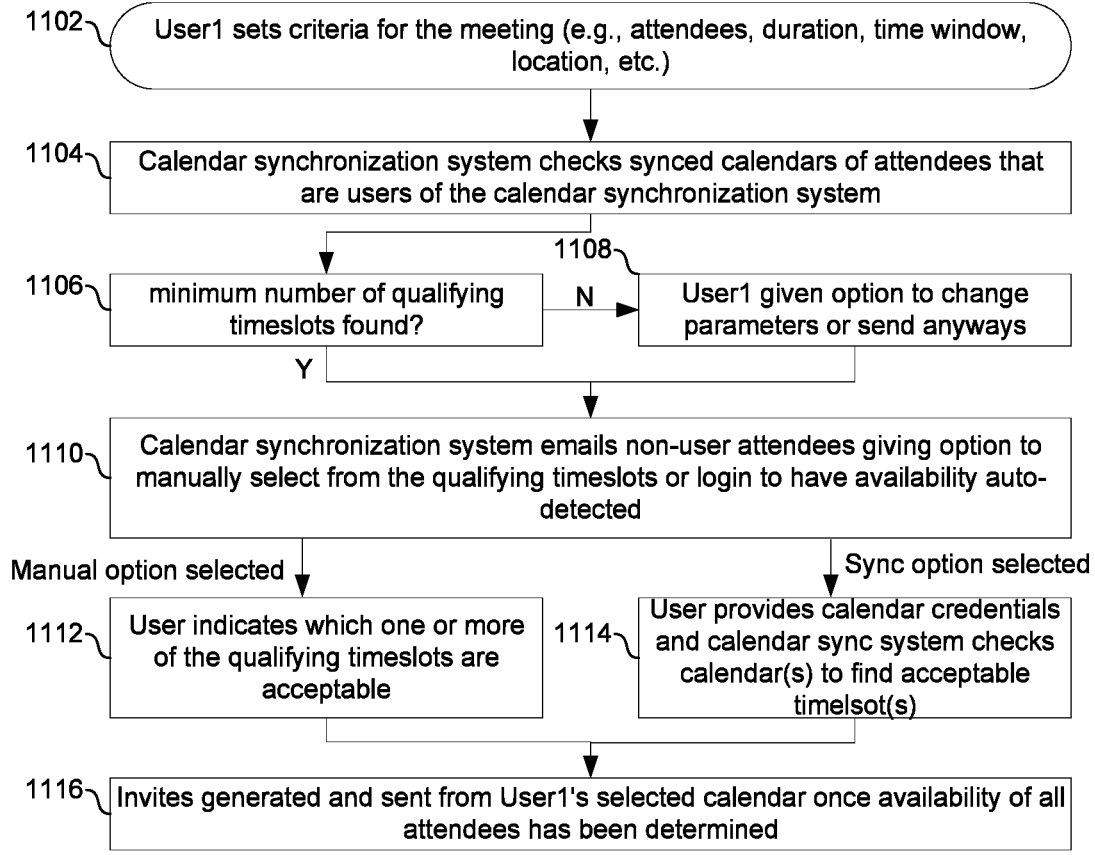
FIG. 11 shows an example process for scheduling events via the calendar synchronization system.

The calendar synchronization system 206 is also operable to facilitate the scheduling of events among two or more people by automatically checking their calendars in order to identify timeslots which are available on all of the users' calendars. An example process for this is described with reference to the flowchart of FIG. 11.

In block 1102, a user ("User1") of the calendar synchronization system 206 desires to schedule a meeting and uses a form served by the web service 222 to set criteria for the meeting. The criteria could include required attendees, optional attendees, duration of the meeting, time window during which the meeting is to take place (e.g., a range of one or more days or weeks), location, and/or any other suitable criteria.

In block 1104, the calendar synchronization system 206 determines which of the attendees specified in block 1102 are users of the calendar synchronization system 206 (i.e., have their calendars synchronized via the calendar synchronization system 206). For those attendees, the calendar synchronization system 206 automatically checks their calendars and eliminates timeslots that don't meet the criteria specified in block 1102 and/or where one or more of the users is not available.

In block 1106, if, after block 1104, there are a least a threshold number of qualifying timeslots (i.e., timeslots which all of the user attendees have availability), then the process advances to block 1110. Otherwise the process advances to block 1108. The threshold may be set by the user and/or set by the calendar synchronization system 206 based on empirical evidence of how often it fails to find a suitable time after one or more iterations through all attendees. The threshold may be based on how many attendees for which availability is unknown. The threshold number of timeslots may be set by the user based on the user's preferences. A higher threshold correlates with higher likelihood of finding a time that works for the attendees whose availability is not yet known at block 1106.

In block 1108, User 1 can choose to have the system move forward with trying to schedule the meeting (i.e., move to block 1110) or return to block 1104 to alter one or more criteria.

In block 1110, the calendar synchronization system 206 emails attendees which are not users of the calendar synchronization system 206 (i.e., attendees for which the calendar synchronization system 206 cannot automatically discover availability). The email contains a link to an interface served by web service 222. The form gives the attendee two options: (1) to manually indicate her availability via a form (e.g., to indicate which times meeting the criteria set in block 1102 she is and/or is not available); (2) to provider her calendar credentials to the calendar synchronization system such that the calendar synchronization system can log into her calendar hosts(s) and automatically detect her availability. If the attendee elects the first option, the process advances to block 1112. If the attendee elects the second option, the process advances to block 1114

In block 1112, the attendee manually provides her availability.

In block 1114, the attendee providers her calendar credentials and the calendar synchronization system logs into her calendar host(s) and detects her availability.

In block 1116, once all attendees' availability has been determined, the calendar synchronization system 206 generates and sends a calendar invite for the best-fitting timeslot. The best-fitting timeslot could be one that all attendees have available, could be one that only required attendees have available, could be one that has the most attendees available, etc. The requirements for which timeslots are acceptable for auto-generating a meeting invite may be set by the User 1. If no timeslot meets those requirements, the calendar synchronization system 206 may, for example, email User 1 with a message indicating everyone's availability and let User 1 manually decide whether to select with a less-than-ideal timeslot (e.g., where one or more attendees are not available) or to retry with different meeting criteria.

Note that, were the calendar synchronization system 206 has access to the calendars of all attendees, finding a suitable time can take place automatically without users having to go through the tedious task of manually providing their availability. If no timeslots can be found, then it is only the organizer who has to manually intervene (e.g., to change the criteria set in block 1102).

In accordance with an example implementation of this disclosure, a system (e.g., calendar synchronization system 206) comprises circuitry configured (e.g., hardware 216 configured by software 218) to operate as a calendar synchronization service (e.g., 224) and to operate as a database service (e.g., 220). The calendar synchronization service is configured to query the domain name system (DNS) to determine which one or more levels of event information (e.g., "free/busy", "subject", "full") are permitted to be propagated from a first electronic calendar hosted by a first calendar host (e.g., 202A) to a second electronic calendar hosted by a second calendar host (e.g., 202B). The database service is configured to store a configuration (e.g., in bridges table 739) for propagating events on the first electronic calendar to the second electronic calendar. The calendar synchronization service may be configured to receive, via an application programming interface (API), a notification of a first event on the first electronic calendar, wherein the first event has a start time, duration, summary, description, and one or more attendees. The calendar synchronization service is configured to determine, based on the configuration, to-be-propagated other properties of the first event, which may comprise none, some, or all other properties of the first event (e.g., the other properties comprise ORGANIZER, ATTENDEE, SUMMARY, DESCRIPTION, and/or other properties as would be used to represent the event in an iCalendar file). The calendar synchronization service is configured to issue, in response to the receiving the notification, one or more commands to the second calendar host to generate, on the second electronic calendar, a second event having the start time, the end time, and the to-be-propagated other properties. The API may be an API of the first calendar host, the calendar synchronization service is configured to periodically issue a request to the API of the first calendar, and the reception of the notification may be a response to such a request. The API may be an API of the calendar synchronization service, the calendar synchronization service may be configured to receive a request to the API from the first calendar host (e.g., after registering a webhook with the first calendar host), and the notification may be such a request. The to-be-propagated other properties may comprise a summary property of the first event. The to-be-propagated properties may not include a description property of the first event. The to-be-propagated properties may not include one or more attendees of the first event (e.g., organizer may not be propagated, some or all optional attendees may not be propagated, and/or some or all required attendees may not be propagated. The calendar synchronization service is configured to determine, based on the configuration, whether to propagate event notifications for the first event on the first electronic calendar to the second event on the second electronic calendar. The calendar synchronization service is configured to determine, based on the configuration, whether to set, for the second event on the second electronic calendar, a notification at a different time than a notification set for the first event on the first electronic calendar (e.g., first event is at 9:00 on the first calendar and has a notification set for 15 minutes prior, and the second event is at 9:00 on the second calendar and has a notification set for 0 minutes prior). The configuration may indicate a rule to be used for converting one or more properties of the event received from the first calendar host (e.g., date time with time zone received from the first calendar host) to a corresponding one or more properties needed for propagating the event to the second calendar host (e.g., date time with time zone as sent to the first calendar host).

In accordance with an example implementation of this disclosure, a system (e.g., calendar synchronization system 206) comprises circuitry configured (e.g., hardware 216 configured by software 218) to operate as a calendar synchronization service (e.g., 224) and to operate as a database service (e.g., 220). The database service is configured to store rules (e.g., rules stored in the bridges table 739) for propagating events from a first electronic calendar hosted by a first calendar host (e.g., 202A) to a second electronic calendar hosted by a second calendar host (e.g., 202B). The rules may determine what properties (e.g., any of the properties set forth in the iCalendar specification) of the events on the first electronic calendar are to be propagated to the second electronic calendar. The rules may determine what, if any, notifications are to be added to the second electronic calendar for events propagated from the first electronic calendar. The calendar synchronization service may be configured to receive, via an application programming interface (API), a notification of a first event on the first electronic calendar, wherein the first event has a start time property, duration property, summary property, description property, and one or more attendee properties. The calendar synchronization service may be configured to issue, in response to the receiving the notification, one or more commands to the second calendar host to generate a second event on the second electronic calendar according to the rules for propagating events from the first electronic calendar to the second electronic calendar. The API may be an API of the first calendar host, the calendar synchronization service may be configured to periodically issue a request to the API of the first calendar host, and the reception of the notification is a result of the request. The API may be an API of the calendar synchronization service. The calendar synchronization service may be configured to receive a request to the API from the first calendar host, and the reception of the notification may be a result of the request. The rules may determine what, if any, portion of a summary property of the first event on the first electronic calendar is to be propagated to the second event on the second electronic calendar, and the summary property contains information as would be found in a summary property of an iCalendar file for the first event. The rules may determine what, if any, portion of a description property of the first event on the first electronic calendar is to be propagated to the second event on the second electronic calendar, and the description property contains information as would be found in a description property of an iCalendar file for the first event. The rules may determine what, if any, portion of one or more attendee properties of the first event on the first electronic calendar is to be propagated to the second event on the second electronic calendar, and the one or more attendee properties contains information as would be found in one or more attendee and/or organizer property of an iCalendar file for the first event. The rules may determine that a notification for the second event should be added to the second calendar. The rules may determine that the notification for the second event on to the second calendar is to be at a different time than a notification for the first event on the first calendar. The calendar synchronization service may be operable to, when the rules determine that multiple notifications for the second event are to be added to the second electronic calendar, issue one or more commands to the second calendar host to generate one or more dummy events on the second electronic calendar and set one or more notifications on the one or more dummy events. The rules may determine how to convert time zone information for the first event to corresponding time zone information for the second event.

As used herein, a calendar "event" can be an event, to-do, or journal entry as those terms are used in the iCalendar specification. As used herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As used herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As used herein, the term "exemplary" means serving as a non-limiting example, instance, or illustration. As used herein, the terms "e.g.," and "for example" set off lists of one or more non-limiting examples, instances, or illustrations. As used herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.). As used herein, the term "based on" means "based at least in part on." For example, "x based on y" means that "x" is based at least in part on "y" (and may also be based on z, for example).

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical implementation may comprise one or more application specific integrated circuit (ASIC), one or more field programmable gate array (FPGA), and/or one or more processor (e.g., x86, x64, ARM, PIC, and/or any other suitable processor architecture) and associated supporting circuitry (e.g., storage, DRAM, FLASH, bus interface circuits, etc.). Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to perform processes as described in this disclosure. Another implementation may comprise a non-transitory machine-readable (e.g., computer readable) medium (e.g., FLASH drive, optical disk, magnetic storage disk, or the like) having stored thereon one or more lines of code that, when executed by a machine, cause the machine to be configured (e.g., to load software and/or firmware into its circuits) to operate as a system described in this disclosure.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A system comprising:

circuitry configured to operate as a calendar synchronization service and circuitry configured to operate as a database service, wherein:

the calendar synchronization service is configured to perform a domain name system (DNS) lookup to retrieve a DNS record that determines which one or more levels of event information are permitted to be propagated from a first electronic calendar hosted by a first calendar host to a second electronic calendar hosted by a second calendar host;

the database service is configured to store rules for propagating events on the first electronic calendar to the second electronic calendar;

the calendar synchronization service is configured to receive, via an application programming interface (API), a notification of a first event on the first electronic calendar, wherein the first event has a start time, an end time, and one or more other properties; and the calendar synchronization service is configured to determine, based on the rules, to-be-propagated other properties of the first event, which may comprise none, some, or all other properties of the first event;

the calendar synchronization service is configured to issue, in response to the receive of the notification, one or more commands to the second calendar host to generate, on the second electronic calendar, a second event having the start time, the end time, and the to-be-propagated other properties.

2. The system of claim 1, wherein:
the API is an API of the first calendar host;
the calendar synchronization service is configured to periodically issue a request to the API of the first calendar host; and
the notification is a response to such a request.

3. The system of claim 1, wherein:
the API is an API of the calendar synchronization service;
the calendar synchronization service is configured to receive a request to the API from the first calendar host; and
the receive of the notification is a result of the request.

4. The system of claim 1, wherein the to-be-propagated other properties include a summary property of the first event.

5. The system of claim 4, wherein the to-be-propagated other properties do not include a description property of the first event.

6. The system of claim 1, wherein the to-be-propagated other properties do not include one or more attendees of the first event.

7. The system of claim 1, wherein the calendar synchronization service is configured to determine, based on the rules, whether to propagate event notifications for the first event on the first electronic calendar to the second event on the second electronic calendar.

8. The system of claim 1, wherein the calendar synchronization service is configured to determine, based on the rules, whether to set, for the second event on the second electronic calendar, a notification at a different time than a notification set for the first event on the first electronic calendar.

9. The system of claim 1, wherein the rules dictate how to convert one or more properties of the first event received from the first calendar host to a corresponding one or more properties needed for generating the second event on the second calendar host.

10. The system of claim 9, wherein the one or more properties comprise a start time or end time and the rules dictate a conversion from one time zone to another.

11. A system comprising:
circuitry configured to operate as a calendar synchronization service and circuitry configured to operate as a database service, wherein:
the database service is configured to store rules for propagating events from a first electronic calendar hosted by a first calendar host to a second electronic calendar hosted on a second calendar host, wherein:
the rules determine what properties of the events on the first electronic calendar are to be propagated to the second electronic calendar; and
the rules determine what, if any, notifications are to be added to the second electronic calendar for events propagated from the first electronic calendar;
the calendar synchronization service is configured to receive, via an application programming interface (API), a notification of a first event on the first electronic calendar, wherein the first event has a start time, duration, summary, description, and one or more attendees; and
the calendar synchronization service is configured to issue, in response to the receive of the notification, one or more commands to the second calendar host to generate a second event on the second electronic calendar according to the rules for propagating events from the first electronic calendar to the second electronic calendar.

12. The system of claim 11, wherein:
the API is an API of the first calendar host;
the calendar synchronization service is configured to periodically issue a request to the API of the first calendar host; and
the notification is a response to such a request.

13. The system of claim 11, wherein:
the API is an API of the calendar synchronization service;
the calendar synchronization service is configured to receive a request to the API from the first calendar host; and
the receive of the notification is a result of the request.

14. The system of claim 11, wherein:
the rules determine what, if any, portion of a summary property of the first event on the first electronic calendar is to be propagated to the second event on the second electronic calendar; and
the summary property contains information as would be found in a summary property of an iCalendar file for the first event.

15. The system of claim 11, wherein:
the rules determine what, if any, portion of a description property of the first event on the first electronic calendar is to be propagated to the second event on the second electronic calendar; and
the description property contains information as would be found in a description property of an iCalendar file for the first event.

16. The system of claim 11, wherein:
the rules determine what, if any, portion of one or more attendee properties of the first event on the first electronic calendar is to be propagated to the second event on the second electronic calendar; and
the one or more attendee properties contains information as would be found in one or more attendee and/or organizer property of an iCalendar file for the first event.

17. The system of claim 11, wherein the rules determine that a notification for the second event should be added to the second electronic calendar.

18. The system of claim 17, wherein the rules determine that the notification for the second event on to the second electronic calendar is to be at a different time than a notification for the first event on the first electronic calendar.

19. The system of claim 11, wherein the calendar synchronization service is operable to:
when the rules determine that multiple notifications for the second event are to be added to the second electronic calendar:
issue one or more commands to the second calendar host to generate one or more dummy events on the second electronic calendar; and
set one or more notifications on the one or more dummy events.

20. The system of claim 11, wherein the rules specify conversion of start and end times from one time zone to another.

* * * * *